US006330357B1

(12) United States Patent
Elmenhurst et al.

(10) Patent No.: US 6,330,357 B1
(45) Date of Patent: Dec. 11, 2001

(54) EXTRACTING USER DATA FROM A SCANNED IMAGE OF A PRE-PRINTED FORM

(75) Inventors: Brian J. Elmenhurst; Richard H. Tyler, both of Redmond, WA (US)

(73) Assignee: RAF Technology, Inc., Redmond, WA (US)

( * ) Notice: Subject to any disclaimer, the term of this patent is extended or adjusted under 35 U.S.C. 154(b) by 0 days.

(21) Appl. No.: 09/544,802

(22) Filed: Apr. 7, 2000

Related U.S. Application Data

(60) Provisional application No. 60/128,232, filed on Apr. 7, 1999, and provisional application No. 60/128,228, filed on Apr. 7, 1999.

(51) Int. Cl.[7] .................................................... G06K 9/34
(52) U.S. Cl. ............................ 382/175; 382/305; 382/179
(58) Field of Search .................................... 382/175–179, 382/180, 186–189, 199, 284, 202, 305, 267, 137, 162–164, 254, 173, 171, 112; 358/501, 538, 462–464, 401, 452, 453; 707/505–508

(56) References Cited

U.S. PATENT DOCUMENTS

| | | | |
|---|---|---|---|
| 4,326,258 | 4/1982 | de la Guardia | 382/137 |
| 4,577,235 | 3/1986 | Kannapell et al. | 358/462 |
| 4,741,045 | 4/1988 | Denning | 382/178 |
| 4,817,179 | 3/1989 | Buck | 382/254 |
| 5,038,381 | 8/1991 | Nelson | 382/178 |
| 5,181,255 | * 1/1993 | Bloomberg | 382/178 |
| 5,321,768 | 6/1994 | Fenrich et al. | 382/178 |
| 5,488,491 | 1/1996 | Steinkirchner | 358/501 |
| 5,579,407 | 11/1996 | Murez | 382/164 |
| 5,619,592 | 4/1997 | Bloomberg et al. | 382/175 |
| 5,623,558 | 4/1997 | Billawala et al. | 382/254 |
| 5,657,395 | 8/1997 | Hirota et al. | 382/163 |
| 5,680,479 | 10/1997 | Wang et al. | 382/176 |
| 5,694,494 | 12/1997 | Hart et al. | 382/305 |
| 5,790,711 | 8/1998 | Murakami | 382/267 |
| 5,883,973 | 3/1999 | Pascovici et al. | 382/176 |
| 5,889,887 | 3/1999 | Yabuki et al. | 382/178 |

(List continued on next page.)

FOREIGN PATENT DOCUMENTS 62279483   4/1987   (JP) .................................. G06K/9/40

OTHER PUBLICATIONS

Hamburgen, Filterable Preprinted Guidelines for OCR, IBM Technical Bulletin XP 000570744, pp. 3115–3116, Mar. 1973.*

Dec. 12, 2000 International Search Report for international application No. PCT/US00/09199.

European Patent Application No. EP0896294A2 (Xerox Corporation), published Oct. 2, 1999.

(List continued on next page.)

*Primary Examiner*—Leo Boudreau
*Assistant Examiner*—Ishrat Sherali
(74) *Attorney, Agent, or Firm*—Stoel Rives LLP

(57) ABSTRACT

Human and machine readability of pre-printed forms that have been completed with user data is impeded where the user data overlaps zone descriptions, constraint boxes or other markings of the pre-printed form. A "form fracturing" methodology is described that includes processing the composite-image data so as to attach one or more shared pixels to a non-diagonally adjacent data pixel. The remaining form pixels can be removed, resulting in at least a useful approximation and often a complete recovery of the user data. Where blank-form data is not available, a "virtual dropout" technique allows for recovering user data from a pre-printed form using limited speckle size and configurations, constraining gray-scale value, or a combination of the two. The disclosed methodologies are conveniently implemented in software on any digital processor.

13 Claims, 8 Drawing Sheets

U.S. PATENT DOCUMENTS

| | | | |
|---|---|---|---|
| 5,896,464 | 4/1999 | Horiuchi et al. | 382/178 |
| 6,005,976 | 12/1999 | Naoi et al. | 382/202 |
| 6,021,221 | 1/2000 | Takaha | 382/199 |

OTHER PUBLICATIONS

European Patent Application No. EP0814422A3 (Canon KK), published Jan. 28, 1998.

French publication No. 2756952 (Itesoft), Demande de Brevet D'Invention, published Jun. 12, 1998.

French publication No. 2737930 (Itesoft), Demande de Brevet D'Invention, published Feb. 21, 1997.

Kobayakawa, Tatsu, "Auto Music Score Recognizing System," *Character Recognition Technologies, SPIE*, vol. 1906 (1993), pp. 112–123.

Clarke, A. T., et al., "Using a Micro to Automate Data Acquisition in Music Publishing," *Microprocessing and Microprogramming*, vol. 24, 1988, pp. 549–553.

Roach, J. W., et al., "Using Domain Knowledge in Low-Level Visual Processing to Interpret Handwritten Music: an Experiment," 1023 *Pattern Recognition* 21 (1988) No. 1, Elmsford, New York, pp. 33–44.

Hamburgen, A., "Filterable Preprinted Guidelines for Optical Character Recognition," *IBM Technical Disclosure Bulletin*, IBM Corporation, New York, vol. 15, No. 10, Mar., 1973, pp. 3115–3116.

\* cited by examiner

EXTRACTING USER DATA FROM A SCANNED IMAGE OF A PRE-PRINTED FORM

This application is a continuation and claims priority from U.S. provisional application Ser. No. 60/128,228 filed Apr. 7, 1999, and also is a continuation and claims priority from U.S. provisional application No. 60/128,232 also filed Apr. 7, 1999.

TECHNICAL FIELD

This invention pertains to extracting information from a scanned version of a pre-printed form. More specifically, the invention pertains to a fast and convenient technique for processing scanned image data to obtain information placed on a form document and distinguish that information from the form document itself.

BACKGROUND OF THE INVENTION

Pre-printed forms are commonly used for many applications. For some applications, such as medical claim forms, the forms are used in such great numbers that computerized "reading" of the forms is not only desirable but essential. Form documents are typically pre-printed sheets of paper that have blanks or open areas on them where information is to be supplied by the person completing the form. This information, referred herein as "user data" may be entered by hand or a printing device such as a printer or typewriter. Other examples of commonly used forms include shipping documents, purchase orders, insurance records, and so forth.

To facilitate interpretation of these forms and the retrieval of user data from them, it becomes necessary to be able to distinguish and separate the user data from the information which was previously printed on the form. For example, the form may have been pre-printed with instructions, boxes to be filled in, and other markings. Removable of the pre-printed markings before attempting to "read" the user data, for example using optical character recognition (OCR) systems, is highly desirable.

If the pre-printed form is well defined, for example in a computer data file, or if a clean, blank pre-printed form is available for scanning, one can take steps to "subtract" the pre-printed indicia from a completed form, leaving only the user data for a subsequent interpretation. This approach would work fine, theoretically, but in practice there are often conflicts between the pre-printed markings and the user data. This occurs wherever the user data overlaps the pre-printed markings. Digital data corresponding to these common areas as referred to later as "shared pixels." Shared pixels can arise when a line or box on the form intersects the data to be extracted, for example as illustrated in FIG. 1 (further described below). Shared pixels also arise where pre-printed text such as a zone description or other instructions on a form intercept the data to be extracted. For example, referring to FIG. 2, one portion of a pre-printed form includes the zone description "patient's name." In the figure, the patient's last name "MOSER" was subsequently printed or typed onto the form in a location that overlaps the zone description. This makes it difficult to "read" the user data, especially using automated OCR techniques.

One solution to this problem has been to employ a particular printing color for the form and a corresponding color filter for scanning for the form after it has been completed. In such situations, a different color ink is employed to complete the form, in other words to enter user data, from the color used to print the form. During scanning of the completed form, a matched color filter is used to block the pre-printed markings from being scanned. This technique is functional, but it is severely limited because form suppliers, or businesses that use forms, are forced to employ specially selected types of ink and colors, as well as scanners that are especially adapted to filter selected ink colors. It would be desirable to be able to extract user data from pre-printed form without restricting the ink colors that are used either on the form or to enter user data.

U.S. Pat. No. 5,694,494 (Hart, et al.) entitled "electronic retrieval of information from form documents" describes a method for retrieving user data from a scanned version of a completed document. That method includes the steps of obtaining a first image of the document having information printed thereon in its blank format before other information has been added to it by the user. A second image of the document is obtained after information has been added to it by the user. The two images are aligned, and for each pixel in the first image which corresponds to information on the second document, those pixels are deleted from the second image to create an image which corresponds to subtraction of the first image from the second image. Finally, a step is performed to electronically restore the information added by the user which was deleted during the subtraction operation. See abstract. While the described "subtraction" step is not difficult, restoring missing data is quite challenging. The methods described in the —494 patent for restoring missing user data require extensive analysis and calculations, and therefore can be expected to be reasonably slow in operation.

Another method for "restoration of images with undefined pixel values" is described in U.S. Pat. No. 5,623,558 (Billawala, et al.). That patent describes method for using a threshold value and a "neighborhood configuration" to restore an image. According to the patent abstract, "the neighborhood configuration defines a geometric region, typically a fixed number of pixels, surrounding the target pixel. The threshold value specifies a number of pixels in the neighborhood configuration for which pixel values are known. In our [that] system, for each pixel in one of the unknown regions, an analysis is performed over the entire area defined by the neighborhood configuration. If the threshold number of pixels within that region is known, then the value of the unknown pixel is calculated. If the threshold value is not achieved, then analysis proceeds to the next pixel location. By continuing the process and reducing the threshold value when necessary or desirable, the complete image can be restored." See abstract.

In view of the foregoing background and brief summary of the prior art, the need remains for method to separate and remove pre-printed markings such as zone descriptions from a completed form that is reliable, simple to implement and fast in operation.

It is also well known to provide defined spaces, called constraint boxes, for users to write in on a pre-printed form. Frequently, one box is provided for each character to be entered by hand and later recognized by a computer. Constraining the character locations is very helpful to the OCR process. For example, the computer can assume that what appears within a single constraint box is indeed a single character, thereby simplifying the recognition problem. Still, the problem arises that user's often fail to constrain their handprint within the spaces provided. User markings (data) often encroach into or across the constraint boxes. Since the constraint boxes are part of the pre-printed form, we again have the problem of separating user data from the blank form.

One solution in the prior art is to print the form, and more specifically the constraint boxes, using "dropout ink" as described above. Use of dropout ink enhances readability for handprint and machine printed data as well. However, it requires special inks to prepare the form and special equipment to drop out the form during scanning. The need remains for separating printed forms, including constraint boxes, from user data in order to recover the user data without requiring special inks or special scanning equipment.

SUMMARY OF THE INVENTION

In accordance with a first aspect of the present invention, a completed form is optically scanned or otherwise processed so as to form digital data representative of the completed form. The digital data is created or further processed if necessary to reduce it to binary pixel data, in which each pixel is assigned a single binary value, for example 0 indicating white and 1 indicating black. (Various threshold methods are known for reducing gray scale data to form binary data.) The resulting data may conveniently stored in the form of a matrix or array of bits, each bit corresponding to one pixel of composite image.

The present invention calls for identifying all common or "shared pixels" in the composite image. All black data pixels that are not common to the pre-printed form are defined as "non-shared data pixels." Pixels are modeled as being square, i.e., as having four sides, for simplicity of calculations though they need not be so constrained. The method calls for "attaching" to the non-shared data pixels all shared pixels that are non-diagonally adjacent to at least one non-shared data pixel. These particular shared pixels are called 4-by pixels, as there are four sides to the pixel, at least one of which is in parallel adjacency to a non-shared data pixel. Formerly shared pixels thus attached become effectively part of the non-shared data pixels so that they are not removed in subsequent processing. This leaves more of the data pixels intact after removing the remaining form pixels. Since the attached pixels are essentially removed from the form pixels, the original form is broken up or "fractured" so we refer to this technique as form fracturing.

In the simplest case, just one 4-by pixel is attached to an adjacent non-shared data pixel. Additional shared pixels, i.e., more than one shared pixel, can be "attached" as a consequence of a single adjacent non-shared data pixel. The number of shared pixels attached in this manner preferably varies in response to the point size of the characters to be extracted and, hopefully, later recognized. The specific pattern or geometric arrangement of the attached pixels also can be varied, again preferably in response to the nature of the characters to be extracted.

After the step of attaching appropriate shared pixels to the (non-shared) user data pixels, the method calls for removing from the composite image all pixels that are part of the pre-printed form except the attached shared pixels. This "form fracturing" process has the effect of preserving most if not all of the data pixels that would otherwise be removed as being part of the pre-printed form. The technique does not always preserve all of the user data pixels, but it does provide at least a useful approximation of the user data pixels. By useful approximation we mean data that will lend itself to optical character recognition with an acceptable error rate.

As noted, the scanned composite image can be efficiently stored in a computer memory and processed using one bit to represent each pixel of the image. This can be done for an entire form or some portion of it. At 300 dots or pixels per inch (dpi) scanner resolution, an 8"×11" form translates to an image of approximately 2400 by 3300 pixels for a total of 7.9 megabits—a modest amount of memory by contemporary standards. Put another way, if a given computer implemented a 24-bit word size, it would take only 100-word-long array to represent one horizontal line or scan line of an 8-inch-wide form at 300 dpi. Approximately 150 lines would adequately cover the length of the form. Thus the image data can conveniently be described and implemented as a matrix. In such an embodiment, the present invention is directed to a computer-implemented method for extracting user data from a composite image where the composite image is presented as digital data defining a matrix of pixels and the method comprises the following steps:

receiving a matrix F of form pixel data defining the pre-printed form;

receiving a second matrix X of composite image pixel data defining the composite image;

determining an intersection of the F and X of matrixes to form another matrix S defining the shared pixels;

subtracting the shared pixel matrix S from the composite image matrix X to form a fourth matrix Y defining non-shared user data pixels. The shared pixel matrix S is compared to the non-shared user data matrix Y so as to identify all shared pixels that are non-diagonally adjacent to at least one non-shared user data pixel, and the result is another matrix Z defining attached pixels. Optionally, as noted above, the Z matrix can be amended to include more than one attached pixel for each shared pixel that is non-diagonally adjacent to a non-shared user data pixel. The method then calls for subtracting the pre-printed form matrix F, except for the attached pixels Z, from the composite image pixels X to recover at least a useful approximation of the user data pixels.

The present invention can be implemented on virtually any digital computer. Specific implementation can be effected by any programmer of ordinary skill in the art in view of the present description. The result of the described invention is that, for example when zone descriptions and user data overlap, a larger portion of the user data character (s) remains intact, thus providing the OCR a more concrete feature extraction (character) to work with. This technology is not only helpful with OCR, but it can also make the filled in form more easily readable to humans. The technique just summarized requires that the blank form (or data defining the blank form, matrix F) is available to carry out the described process.

Another aspect of the invention is directed to recovering user data without requiring that the pre-printed form be available or defined a priori. This technique, called "virtual dropout," employs a special new type of form that can be removed from a composite image by appropriate processing, leaving only the user-entered data for subsequent recognition. To achieve virtual dropout, the form is printed using "speckles" as defined shortly in lieu of solid lines. The speckles that make up the form are easily removed, while the user data, which generally comprises contiguous markings, remains. Speckles are most effective for forming straight lines such as constraint boxes.

Speckles are defined as small clumps or blocks of pixels having limited size, for example of maximum of 36 pixels (6×6) at 300 dpi. Speckles should be spaced apart in a range of approximately 6 to 10 pixels. This makes it easy to isolate and remove them, while a series of such speckles still does its intended job of forming a line or constraint box visible to the user completing the form. The box just appears lighter than if it were formed of a solid line. Speckles preferably are defined by "speckle size" which is the number of non-diagonally contiguous pixels, in other words, the number of contiguous pixels that are neighboring on horizontal or vertical sides. Examples are illustrated later in the drawings. Software can be employed to readily find and remove speckles of predetermined size (or less). Thus one aspect of the invention is a printed form or sheet having a constraint box printed thereon, the constraint box being formed of a series of speckles of predetermined maximum size and spaced apart no more than a predetermined maximum spacing such that the constraint box is apparent to the naked eye. Another aspect of the invention is directed to a method of recognizing such speckles for removal from a completed form image, thereby leaving the user data for subsequent recognition.

A further aspect of the invention, another "virtual dropout" technique, calls for forming the pre-printed features of a form, such as instructions or constraint boxes, using a shaded, thin line. A shaded line is one having a gray scale level less than a predetermined maximum, e.g., 25 or 50 percent. (The line need not be formed solely of black ink; color images also have a gray scale equivalent value.) Once again, no special inks or scanner equipment are required. Most standard printers can be used to print at selected gray scale values. Most scanners can be programmed to cause shaded areas having less than a selected threshold gray scale value to drop out. The user data remains. Best results are obtained with a combination of the speckles and shading techniques for virtual dropout. In other words, printing speckles at 50 percent gray yields good results.

Additional objects and advantages of this invention will be apparent from the following detailed description of preferred embodiments thereof which proceeds with reference to the accompanying drawings.

BRIEF DESCRIPTION OF THE DRAWINGS

FIGS. 7A–7G illustrate various "speckle" configurations.

DTAILED DESCRIPTION OF PREFERRED EMBODIMENT

Figures 1, 2, 3:
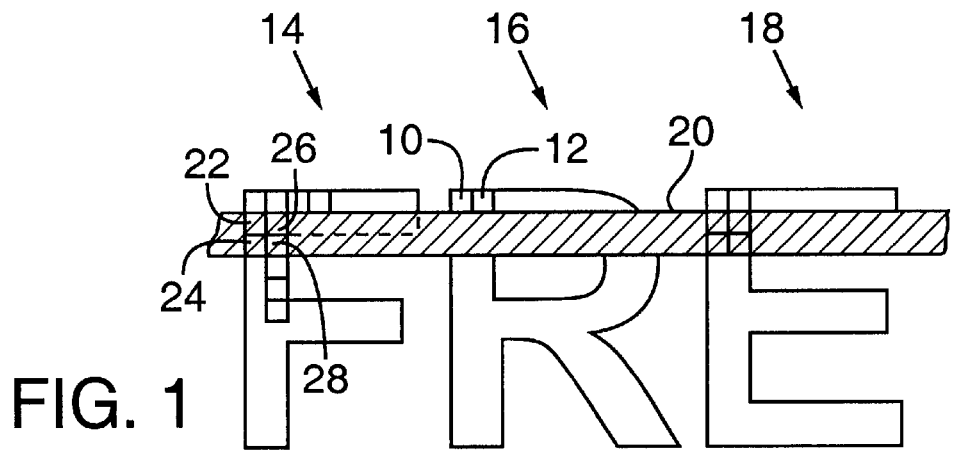
FIG. 1 illustrates a portion of a completed form in which user data overlaps a pre-printed line on the form.
FIG. 2 illustrates a portion of a completed form in which user data overlaps a pre-printed zone description on the form.
FIG. 3 is an enlarged view of a selected region of FIG. 2 illustrating form pixels, shared pixels, and non-shared user data pixels.

FIG. 1 illustrates a portion of a completed form in which the user data overlaps a line, for example, a portion of a constraint box, that was pre-printed on the form. In FIG. 1, individual squares, for example, squares 10 and 12, represent individual pixels in an image. User data, which may have been entered using a typewriter or the like, comprises the letters "FRE" indicated in the drawing by reference numbers 14 ("F"), 16 ("R") and 18 ("E"). In this simplified illustration each character has a size of approximately 8 pixels wide and 12 pixels high although this can vary substantially. For example, at a resolution of 300 dots per inch (dpi), there would be a little over four pixels per point, where a point as 1/72of a inch. Thus even a small font such as 6 point would be around 25 pixels high. The number of pixels is reduced in FIG. 1 and other drawings in this application to simplify the illustrations. In FIG. 1, a horizontal bar 20 represents a pre-printed portion of the form, such as a constraint box, that extends horizontally through the letters FRE and is two pixels high. Referring to the letter F, one can observe that there are a total of nine pixels in which the letter and the form overlap, referred to in this specification and the appended claims as "shared pixels." However, a computer system processing this data does not "know" a priori which are shared pixels. They are identified as explained below. The shared pixels are 22, 24, 26, 28 and five more pixels extending laterally to the right of pixel 26. OCR is impeded by the presence of shared pixels as mentioned above. Below, we describe a process for recovering the user data portion of the data.

Figure 4A:
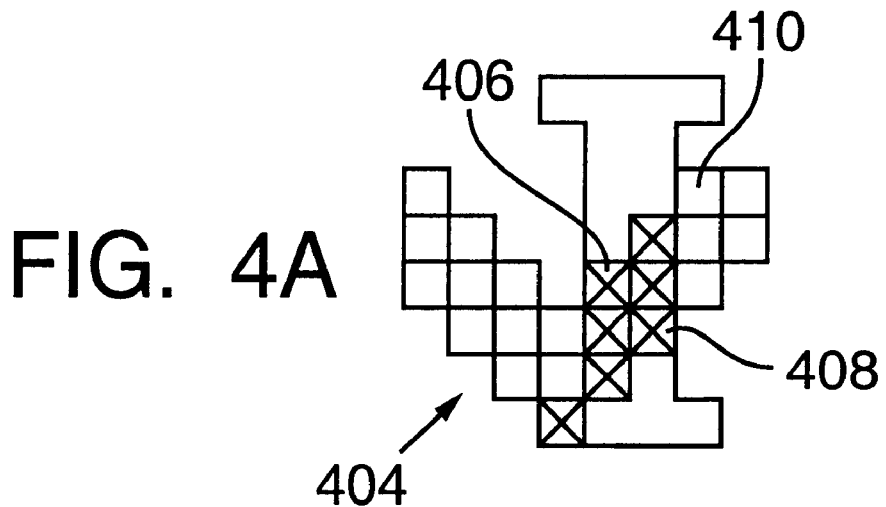
FIGS. 4A–4C illustrate a process according to the present invention for recovering user data from a completed form in which the user data overlaps pre printed markings on the form.
Figure 4B:
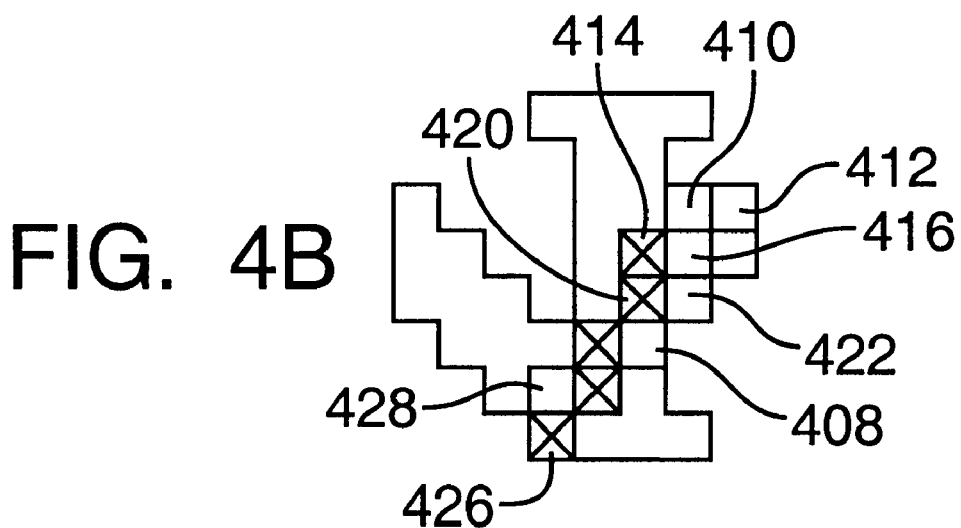

FIG. 2 illustrates an example where user data, here the word "MOSER" is overlapping information that was pre-printed on a form, viz. a zone description "Patient Name." While the user data is illustrated here as being typed, it could also be entered by hand. The present invention is applicable independent of the means used to enter user data on the pre-printed form. FIG. 3 is an enlarged view of a portion of FIG. 2, showing where the letter M (user data) overlaps the zone description. A relatively small number of pixels are shown here (as small boxes) to simplify the illustration. Next we focus specifically on the overlapping relationship between the letter M (user data) and the letter I (pre-printed). This overlapping region is illustrated in FIG. 4A. In the figure, a portion of the letter M which does not overlap the letter I is illustrated as pixels 404. Shared pixels, i.e., pixels that are part of both the letter M and the letter I are indicated with superimposed diagonal lines forming an X such as pixel 406. One can observe that there are seven shared pixels in this example. So, for example, pixel 408 is a shared pixel while pixel 410 is a non-overlapping or non-shared user data pixel. The method of the invention calls for "attaching" to the non-shared data pixels all shared pixels that are non-diagonally adjacent to at least one non-shared data pixel. Referring to FIG. 4B, which shows the same pixel area as FIG. 4A, pixels 410 and 412 are non-shared data pixels. Shared pixel 414 is diagonally adjacent to pixel 410 and is laterally or non-diagonally adjacent to pixel 416. According to the invention, pixel 414 will be linked or "attached" to pixel 416 (but not to pixel 410). Similarly, shared pixel 420 is attached to non-shared data pixel 422, and so on.

Figure 4C:
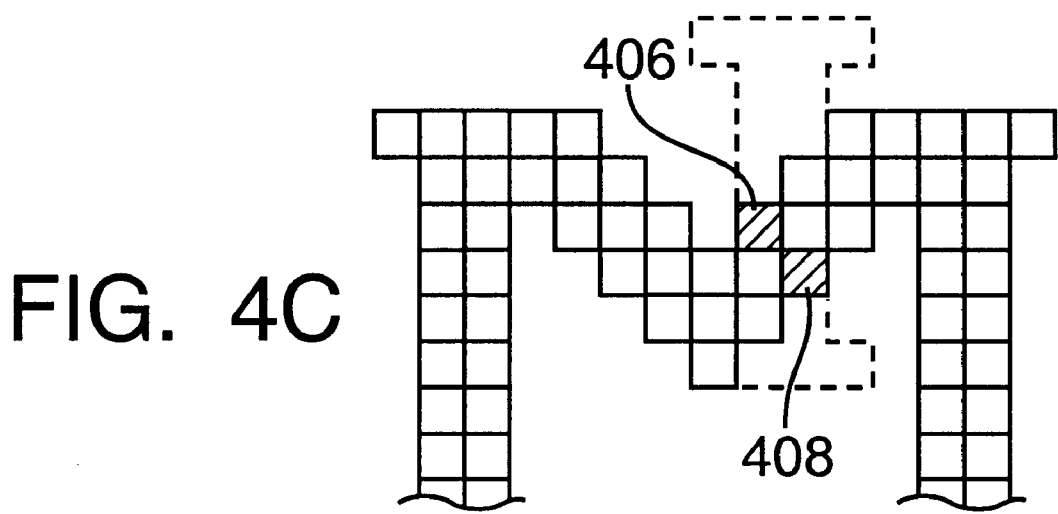

Shared pixel 408 (FIG. 4A) is not attached because it is not non-diagonally adjacent to a non-shared user-data pixel. In FIG. 4B, x's are shown only on the shared pixels that are attached to the user data. Shared pixel 426 (FIG. 4B) is attached to user-data pixel 428 because the two are non-diagonally, here vertically, adjacent. After appropriate shared pixels are attached to the user data, the remaining shared pixels are removed to recover at least a useful approximation of the user data. The result in this illustration is shown in FIG. 4C. In FIG. 4C, one can see that the letter "M" has been recovered, with the exception of only two pixels, 406 and 408. This is a distinct improvement as compared to losing all of the shared pixels shown in FIG. 4A.

Figure 5A:
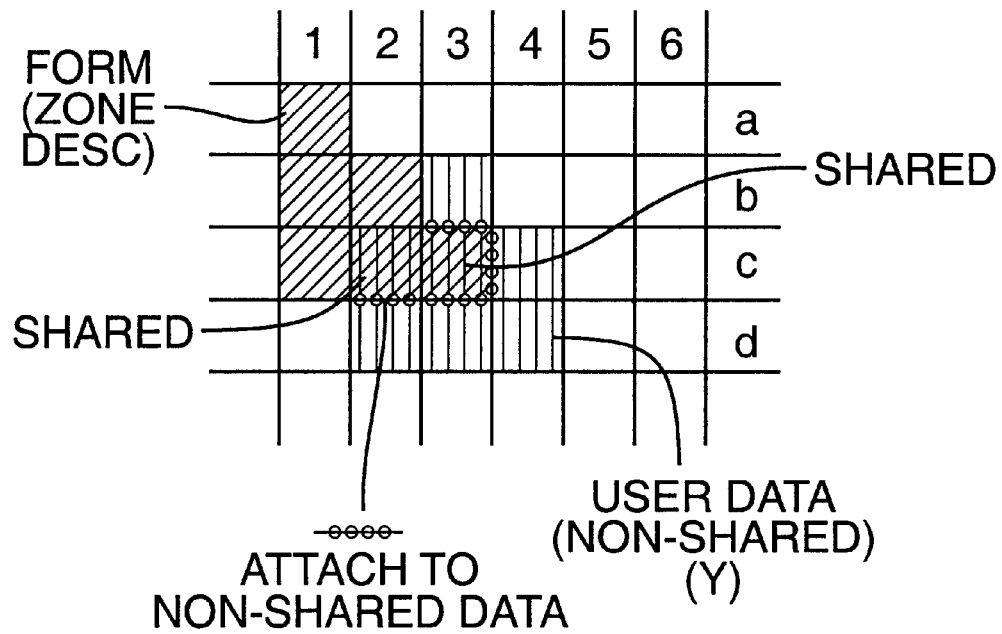
FIGS. 5A–5B illustrate another example of the inventive process for recovering user data from a completed form.
Figure 5B:
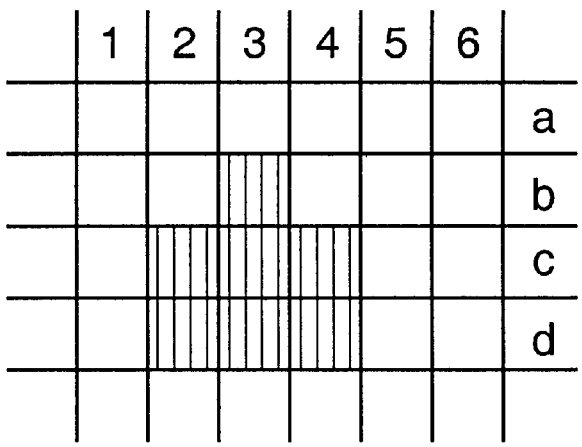
Figure 7A:
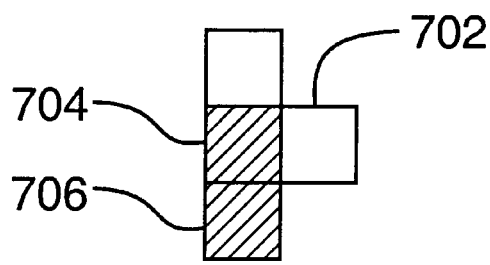
Figure 7B:
Figure 7C:
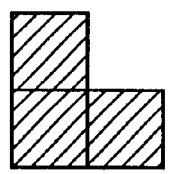
Figure 7D:
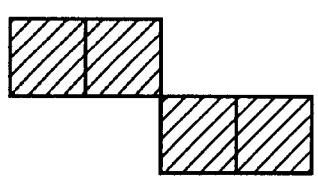
Figure 7E:
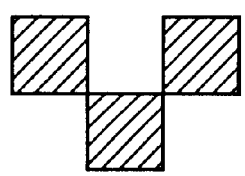
Figure 7F:
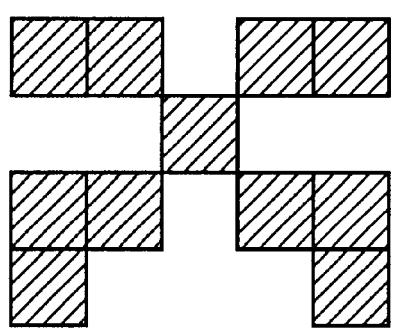

FIG. 5 is another illustration of this "attaching" process. In FIG. 5A, a small portion of a matrix of pixel data is shown using the numerals 1 2 6 to identify the columns of the matrix and letters "a" through "d" to identify the rows. Here, pre-printed markings on a form, such as a zone description, are indicated by diagonal shading, for example as in pixel 1a. User-data pixels are indicated by parallel vertical lines, for example as in pixel 3b. Thus, pixels 2c and 3c are common or shared pixels. Shared pixel 2c will attach to non-shared user-data pixel 2d because they are non-diagonally adjacent, and shared pixel 3c will attach to any one or more of data pixels 3b, 4c and 3d because each of them is non-diagonally adjacent to the shared pixel. If we then remove the pre-printed form pixels from the composite image of FIG. 5A, the result is complete recovery of the user data, as illustrated in FIG. 5B. Graphic image data, or pixel data, can conveniently be stored and processed on a digital computer in matrix form. Thus, the process described above can be summarized as follows. First, receiving a matrix F of form-pixel data defining the pre-printed form. Second, receiving a second matrix X of composite image-pixel data defining the composite image, i.e., a completed form. Third, determining an intersection of the F and X matrixes to form another matrix S defining shared pixels. Next, subtracting the shared-pixel matrix S from the composite matrix X to form a fourth matrix Y defining non-shared user-data pixels. The shared pixel matrix S is then compared to the non-shared user-data matrix Y so as to identify all shared pixels that are non-diagonally adjacent to at least one non-shared user-data pixel, and the result is another matrix Z defining attached pixels. In the illustrations of FIGS. 4 and 5, we show attaching only a single shared pixel to an appropriate data pixel. However, multiple pixels can be attached in response to a single user data contacting (non-diagonally adjacent) a shared pixel. For example, two, three or more pixels can be attached to such a data pixel, thereby infiltrating into the shared pixel area, subject to the limitation that only shared pixels can be attached. For example, referring to FIG. 7A, assume that 702 is a (non-shared) data pixel. One option would be to attach a single, shared pixel as described above. In that case, shaded pixel 704 would be attached to pixel 702. Alternatively, the policy might be to attach a pair of pixels, e.g., 704, 706, to an adjacent data-pixel 702. But, 706 would be included only if it were, in fact, a shared pixel. FIGS. 7B, 7C, 7D and 7E show other examples of multiple-pixel speckles that could be attached to individual user-data pixels within the scope of the invention.

Figure 6A:
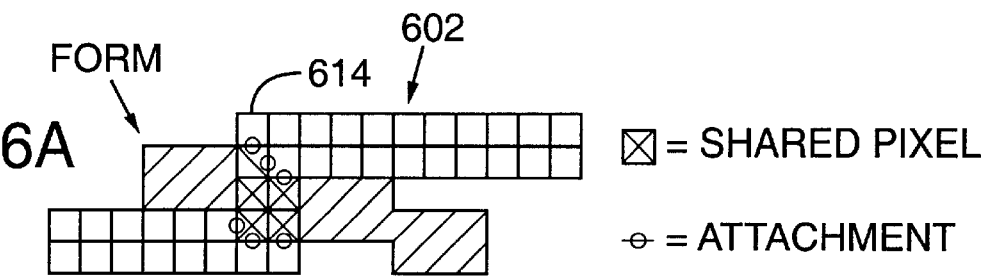
FIGS. 6A–6C illustrate a further example of operation of the present invention to recover user data from a form.
Figure 6B:
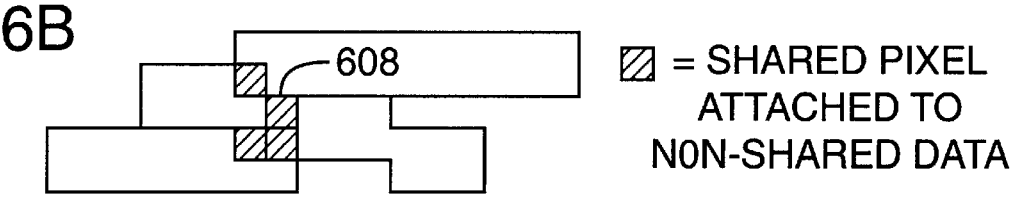
Figure 6C:
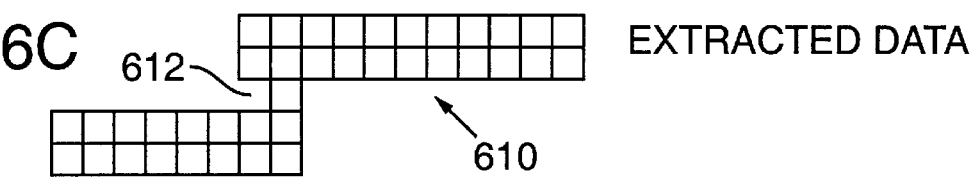

With reference to FIG. 7, we take this opportunity to define "speckle size." "Speckle size" refers to the number of contiguous, non-diagonally adjacent pixels in a speckle. For example, FIG. 7B has a speckle size of three, as does the speckle in FIG. 7C. In FIG. 7D, the speckle size is only two, even though four pixels are shown, because two is the maximum number of non-diagonally adjacent contiguous pixels. In this regard, FIG. 7E illustrates a speckle consisting of three pixels, although the speckle size is one. It is relatively straightforward to create algorithms for processing image data in a digital computer but can identify (and subsequently remove) speckles of a selected size (or smaller). Speckles are discussed further below. First, we complete the description of the basic "form fracturing" technique with reference to FIG. 6. (The technique illustrated in FIGS. 2 through 6 is called "form fracturing" because form is broken up or fractured through the process of attaching shared pixels to the user data.) Referring to FIG. 6A, user data occupies a contiguous series of pixel 602 while the form data, which may be part of a constraint box or zone description, consists of pixels generally indicated as 604. Shared pixels are shown with a superimposed "x" as before. FIG. 6B illustrates the process in which shared pixels are attached to non-diagonally adjacent data pixels. The attached, shared pixels are indicated with shading, for example pixel 608. After removal of the form pixels that are not attached, the resulting recovered user data 610 is illustrated in FIG. 6C. In this example, all of the original user data 602 was recovered, with the exception of pixel 612. Pixel 612 was not adjacent to a data pixel for attachment. However, if the algorithm called for attaching two pixels (for example, as described above with reference to FIG. 7A), pixel 612 would have been attached (indirectly to pixel 614) and, thus, the user data would have been completely recovered. The use and selection of multiple-pixel speckles can be varied and selected depending upon the nature of the data to be processed. In general, the speckle size of the attached, shared pixels should be varied in direct proportion to the font or point size of the user data.

VIRTUAL DROPOUT

The form-fracturing process described above can be used effectively even where both the pre-printed markings and the user data have the same size, color and shade (gray scale value), but it does require knowledge of the blank form. That information, describe above as matrix F of form-pixel data, can be supplied by the author of the form as digital data or it can be scanned to create the digital image. Another aspect of the invention, called "virtual dropout," provides a method for recovering user data from a pre-printed form without requiring knowledge of the blank form. According to this aspect of the invention, the blank form, i.e., the various lines, boxes, logos, zone descriptions, etc., can be printed using any ordinary printer and any ordinary ink. However, to enable convenient recovery of user data, the pre-printed markings on the form must be formed using limited speckle size, limited gray scale value or a combination of the two.

"Speckle size" was defined earlier with reference to some example shown in FIG. 7. Various other speckle sizes and configurations can be created within the scope of the invention. The key is that speckles of limited size, as noted, are easily removed by software. The preferred maximum speckle size is about 36 pixels (6×6) or less at 300 dpi. The space between pixels should be approximately six to ten pixels. If the resolution is less than 300, the number of pixels should be scaled. So, for example, at 200 dpi the number of pixels per block or speckle is two-thirds of 36, which is 24. By way of comparison, a typical pencil or other writing implement might have a line width of one-half to one millimeter. At 300 dots per inch, there are approximately 12 dots per millimeter, so the line width of hand-print data entered on a form would be approximately 6 to 12 dots or pixels. Even a narrow line of six pixels' width will be contiguous over a length of many pixels in forming the typical alpha numeric character. So, even if speckles of size 6×6 or smaller are removed, it would not affect the user data.

Figure 8A:
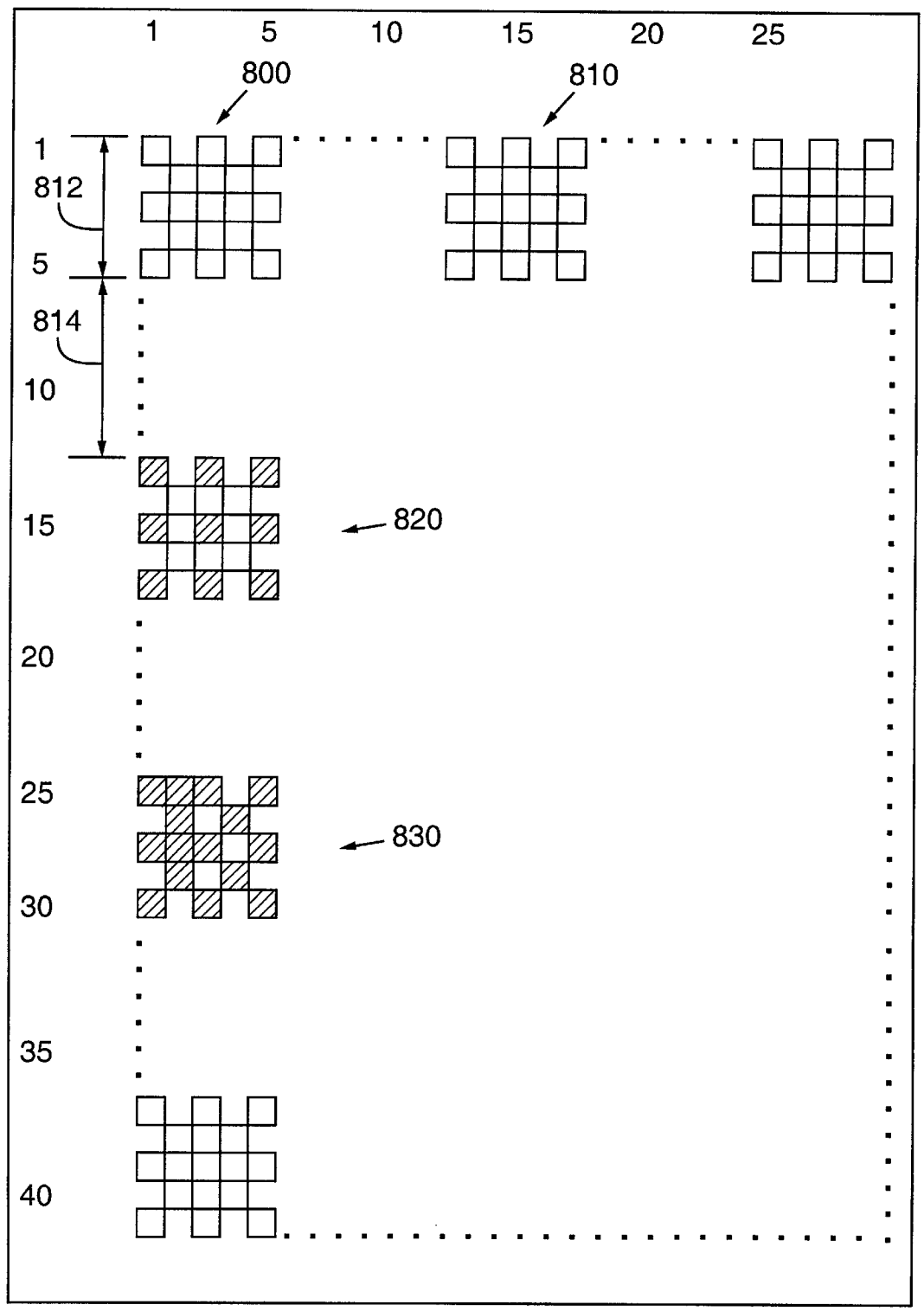
FIGS 8A–8C illustrate example of forming a constraint box.
Figure 8B:
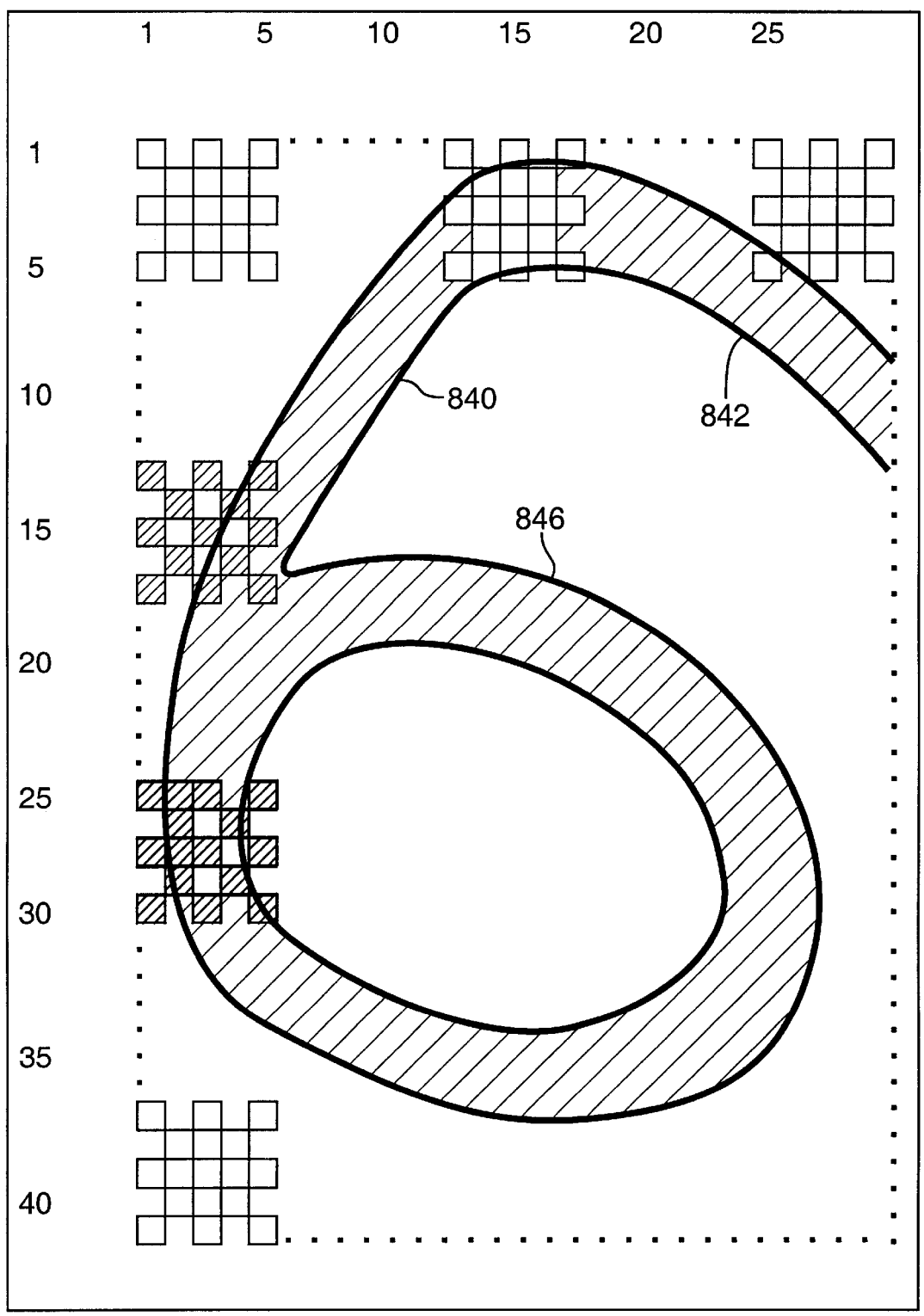
Figure 8C:
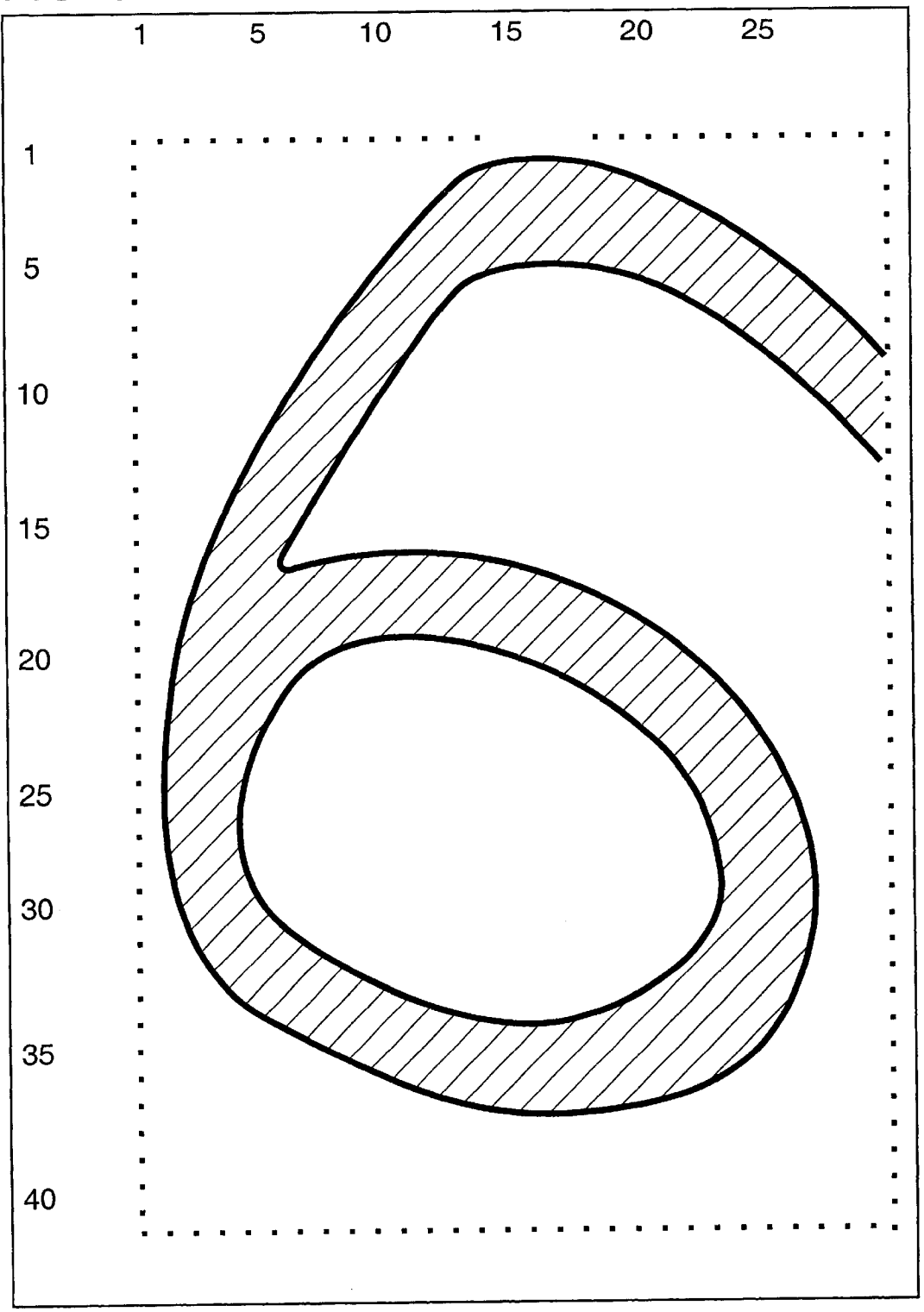

FIG. 8A illustrates just one example of forming a constraint box (or in this case, just the upper-left corner of a constraint box) for virtual dropout. In this illustration, the constraint box is not formed of a continuous line. Rather, it is formed of a series of speckles, for example speckles 800 and 810. This constraint box is illustrated as being about 30 pixels wide and 40 pixels tall. The "line thickness" forming the box is five pixels, indicated at 812. This dimension is not critical and, certainly, a wider line width could be used. Each individual speckle has overall size of 25 pixels arranged in a 5×5 square, as illustrated. There is also a spacing between pixels of seven pixels, as shown at 814. The individual speckles are not contiguous, however. As shown by shading at speckle 820, only alternate pixels are black, or "on," thus forming a checkerboard pattern. Since there are a total of nine black pixels out of 25 total pixels, each speckle will have an apparent gray-scale value of 9/25, which equals 36 percent. This configuration would result in a relatively faint constraint box, yet enough to guide the user in locating data within the box. The constraint box is easily removed through software processing. It may be observed that the speckles shown here for illustration have an effective speckle size of just one. An alternative speckle configuration is shown at 830. Here, a total of 15 out of 25 pixels are black, corresponding to 60 percent gray scale, while the speckle size is four. Next, we illustrated these principles in use. FIG. 8B shows the constraint box of FIG. 8A with a hand-print numeral 6 entered on the form as user data. The numeral 6 overlaps the constraint box at several places, and if the constraint box were formed of solid black, it would leave non-shared user-data pixels illustrated as fragments 840, 842 and 846. Those fragments might be difficult for a human reader or a character recognizer to correctly determine the data. Since the constraint box, however, is formed of speckles of limited size, it can be completely removed and, thus, the user data completely restored as indicated in FIG. 8C.

Many pre-printed forms are produced on offset or lithographic printing machines that have relatively high resolution, for example on the order of 2400 dpi. When such forms are scanned, the typical 8 bit (monochrome) document scanner cannot and does not actually resolve individual pixels in the form. Rather, it determines the relative lightness or darkness of a pixel area (defined by the resolution of the scanner) and assigns it a value, for example between 0 and 255 in the case of an 8 bit scanner. A thresholding apparatus can be used to drive a gray scale pixel to black or white, depending in part on neighboring pixels. For example, if a light gray region, e.g., 25 percent gray scale, is surrounded by white, the gray scale pixels will be driven to black. On the other hand, gray pixels that are adjacent to a true black will be driven to white. The effect of all of this is that the scanner automatically "drops out" gray pixels, especially near black. This can be used to advantage to drop out the pre-printed aspects of a form.

First, "virtual dropout" can be achieved by simply printing the form in a suitable light gray tone. Second, the form can be printed using speckles as described above. Finally, very good results have been achieved by using a combination of these two concepts, in which speckles are used and the speckles are printed in a light gray tone. The speckles will tend to be dropped out, as described, and are particularly apt to be driven to white where they are adjacent to true black, such as user data. Isolated speckles, i.e., those surrounded by white, may tend to be driven toward black by the scanner, but they are easily removed because of their small speckle size as described previously.

It will be obvious to those having skill in the art that many changes may be made to the details of the above-described embodiment of this invention without departing from the underlying principles thereof. The scope of the present invention should, therefore, be determined only by the following claims.

What is claimed is:

1. A method for extracting data pixels from a composite image, the composite image consisting of digital data defining a rectilinear array of pixels representative of a pre-printed form having data entered thereon, the method comprising the steps of:

identifying all shared pixels in the composite image;

defining as non-shared data pixels all (black) data pixels that are not common to the pre-printed form;

attaching to the non-shared data pixels all shared pixels that are non-diagonally adjacent to at least one non-shared data pixel; and removing from the composite image all pixels that are part of the pre-printed form except the attached shared pixels, thereby forming a data image having at least a useful approximation of the data pixels.

2. A method according to claim 1 wherein the data entered on the pre-printed form is hand-written data.

3. A method according to claim 1 wherein the data entered on the pre-printed form is alpha-numeric data.

4. A method according to claim 1 wherein the pre-printed form is a medical claim form.

5. A method according to claim 1 wherein the composite image is formed by scanning.

6. A method according to claim 1 wherein the composite image data is pre-processed so that each pixel has one of two predetermined values.

7. A method according to claim 1 wherein the pre-printed form includes a zone description, whereby the zone description is substantially removed from the composite image.

8. A method according to claim 1 wherein said attaching step includes attaching at least two shared pixels to each non-shared data pixel.

9. A method according to claim 8 wherein the attaching step includes attaching shared pixels having a speckle size of six or less.

10. A method according to claim 8 including selecting the attached pixels configuration based on expected data point size.

11. A computer-implemented method for extracting user data from a composite image, the composite image consisting of digital data defining a matrix of pixels responsive to user data entered on a pre-printed form, or a portion thereof, the method comprising the steps of:

receiving a first matrix F of form pixel data defining the pre-printed form;

receiving a second matrix X of composite image pixel data defining the composite image;

determining an intersection of the F and X matrices to form a third matrix S defining shared pixels;

subtracting the third matrix S from the second matrix X to form a fourth matrix Y defining non-shared user data pixels;

comparing the shared pixels S to the non-shared user data pixels Y to identify all shared pixels that are non-diagonally adjacent to at least one non-shared user data pixel, to form a fifth matrix Z defining attached pixels; and then subtracting the pre-printed form pixels F, except for the attached pixels Z, from the composite image pixels X to recover at least a useful approximation of the user data pixels.

12. A method according to claim 11 wherein said comparing the shared pixels S to the non-shared user data pixels Y to form the matrix Z defining attached pixels includes incorporating a plurality of shared pixels into the Z matrix in response to a single, adjacent user data pixel.

13. A method according to claim 11 wherein each such plurality of shared pixels included in the Z matrix defining attached pixels consists of a speckle having a predetermined maximum speckle size.

* * * * *

UNITED STATES PATENT AND TRADEMARK OFFICE
CERTIFICATE OF CORRECTION

PATENT NO. : 6,330,357 B1
DATED : December 11, 2001
INVENTOR(S) : Brian J. Elmenhurst It is certified that error appears in the above-identified patent and that said Letters Patent is hereby corrected as shown below:

<u>Title page,</u>
Item [75], should indicate the sole inventor as -- Brian J. Elmenhurst. --

Signed and Sealed this

Twenty-fourth Day of September, 2002

*Attest:*

*Attesting Officer*

JAMES E. ROGAN
*Director of the United States Patent and Trademark Office*